(12) United States Patent
Conklin

(10) Patent No.: US 6,415,283 B1
(45) Date of Patent: Jul. 2, 2002

(54) METHODS AND APPARATUS FOR DETERMINING FOCAL POINTS OF CLUSTERS IN A TREE STRUCTURE

(75) Inventor: James Conklin, Scotts Valley, CA (US)

(73) Assignee: Orack Corporation, Redwood Shores, CA (US)

( * ) Notice: Subject to any disclaimer, the term of this patent is extended or adjusted under 35 U.S.C. 154(b) by 0 days.

(21) Appl. No.: 09/170,895

(22) Filed: Oct. 13, 1998

(51) Int. Cl.[7] .............................................. G06F 17/30
(52) U.S. Cl. ........................ 707/3; 707/101; 707/104; 707/531; 706/45
(58) Field of Search ........................ 707/3, 5, 10, 531, 707/60, 205, 104, 103, 102, 101, 1; 706/45; 704/9; 369/58, 116; 360/50

(56) References Cited

U.S. PATENT DOCUMENTS

| | | | | |
|---|---|---|---|---|
| 4,649,515 A | * | 3/1987 | Guirguis ..................... 60/39.35 |
| 5,504,887 A | * | 4/1996 | Malhotra et al. ........... 707/205 |
| 5,657,450 A | * | 8/1997 | Rao et al. ..................... 707/10 |
| 5,694,523 A | * | 12/1997 | Wical .......................... 706/45 |
| 5,696,693 A | * | 12/1997 | Aubel et al. ................ 364/490 |
| 5,806,061 A | * | 9/1998 | Chaudhuri et al. ............ 707/3 |
| 5,870,740 A | * | 2/1999 | Rose et al. ..................... 707/5 |
| 5,896,573 A | * | 4/1999 | Yang et al. .................. 455/453 |
| 5,940,821 A | * | 8/1999 | Wical ............................. 707/3 |
| 5,953,718 A | * | 9/1999 | Wical ............................. 707/5 |
| 6,023,695 A | * | 2/2000 | Osborn et al. .................. 707/3 |
| 6,038,560 A | * | 3/2000 | Wical ............................. 707/5 |
| 6,094,652 A | * | 7/2000 | Faisal ............................ 707/5 |
| 6,101,515 A | * | 8/2000 | Wical et al. ................ 707/531 |
| 6,112,168 A | * | 8/2000 | Corston et al. ................ 704/9 |
| 6,144,953 A | * | 11/2000 | Sorrells et al. .............. 707/60 |
| 6,199,034 B1 | * | 3/2001 | Wical ............................ 704/9 |
| 6,253,196 B1 | * | 6/2001 | Fuh et al. ...................... 707/3 |
| 6,260,042 B1 | * | 7/2001 | Curbera et al. ............. 707/101 |

OTHER PUBLICATIONS

Dixon et al., "Temporal Resolution: A Breadth–First Search Approach," Temporal Representation and Reasoning, May 19, 1996, pp. 129–127.*

Lee et al., "An Operation Efficiency Analysis on Breadth First Quatree," Computer, Communications, Control and Power Engineering, Oct. 19, 1993, v.2, pp. 660–663.*

\* cited by examiner

Primary Examiner—Charles L. Rones
(74) Attorney, Agent, or Firm—Stattler, Johansen & Adeli LLP

(57) ABSTRACT

A cluster processing system determines at least one focal node on a hierarchically arranged tree structure of nodes based on attributes of a data set. The data set comprises a plurality of data set attributes with associated weight values. The cluster processing system selects a set of nodes from the tree structure with tree structure attributes that correspond with the data set attributes, and then assigns quantitative values to nodes in the set of nodes from the weight values in the data set. At least one cluster of nodes are selected, based on proximity in the tree structure, and at least one focal node on the tree structure for the cluster of nodes is selected. The focal node comprises an attribute most representative of the data set attributes. A terminological system learns the meaning of terms (attributes of a data set) by identifying categories (nodes) from a knowledge catalog (trees structure).

14 Claims, 9 Drawing Sheets

METHODS AND APPARATUS FOR DETERMINING FOCAL POINTS OF CLUSTERS IN A TREE STRUCTURE

BACKGROUND OF THE INVENTION

1. Field of the Invention

The present invention is directed toward the field of analyzing clusters or relationships of data sets, and more particularly toward identifying clusters of terminology, organized in a knowledge base, for terminological systems.

2. Art Background

Various types of data are collected and subsequently analyzed in numerous applications. For example, in scientific experiments, data is collected by researchers, scientists and engineers. Typically, the data includes multiple variables or attributes. In general, the data points of a data set represents "n" variables or attributes. For example, if a data points represents a coordinate in three-dimensional space, then the data point, when expressed in rectangular coordinates, consists of the variables {x, y, and z}. In some applications, the variables in a data set are independent (i.e., there is no relationships between the variables of a data point). However, in other applications, one or more variables of a data point may have a predetermined relationship.

Often researchers desire to determine whether there is any correlation among the various data points. For example, a set of data points may be analyzed to determine whether some or all of the data points lie in a line, plane, in some other correlative manner.

Techniques have been developed to determine relationships for data, wherein the variables of the data set are independent. These techniques are generally referred to as multi-variant analysis. In general, multi-variant analysis determines if there are any relationships among the independent variables or attributes in a data set. For example, if each independent variable is plotted in n-dimensional space (i.e., each independent variable is a separate dimension), then multi-variant techniques may be applied to determine whether there is a relationship among the variables or attributes of the data set as depicted in the n-dimensional spacial representation. One goal of the multi-variant analysis is to identify data points that generally form a "cluster" when the data points are mapped in an n-dimensional space. This "cluster" effect shows a correlation among the data points in the cluster. Although prior art multi-variant techniques identify clusters for data mapped in n-dimensional space, these techniques assume that the variables are independent. Accordingly, it is desirable to develop "clustering techniques" that are optimized to identify clusters of data points, wherein the variables or attributes are related.

Methods and apparatus for determining focal points of clusters in a tree structure is described herein. The clustering techniques of the present invention have application for use in terminological systems, wherein terms are mapped to categories of a classification system, and the clustering techniques are used to identify categories in the classification system that best reflect the terms input to the terminological system.

SUMMARY OF THE INVENTION

A cluster processing system determines at least one focal node on a hierarchically arranged tree structure of nodes based on attributes of a data set. The tree structure comprises a plurality of nodes, wherein each node includes an attribute. The tree structure is arranged in a hierarchy to depict relationships among the tree structure attributes. The data set comprises a plurality of data set attributes with associated weight values. The cluster processing system selects a set of nodes from the tree structure with tree structure attributes that correspond with the data set attributes, and then assigns quantitative values to nodes in the set of nodes from the weight values in the data set. At least one cluster of nodes are selected, based on proximity in the tree structure, and at least one focal node on the tree structure for the cluster of nodes is selected. The focal node comprises an attribute most representative of the data set attributes, and selection of the focal node includes evaluating the nodes of the cluster starting from a node at the top of the hierarchy of the tree structure and analyzing downward to select the focal node based on the quantitative values and the relationships of the attributes in the tree structure. The cluster processing system has application for use in a terminological system to learn the meaning of terms (attributes of a data set) by identifying categories (nodes) from a knowledge catalog (trees structure).

DETAILED DESCRIPTION

Clustering Techniques

Figure 1:
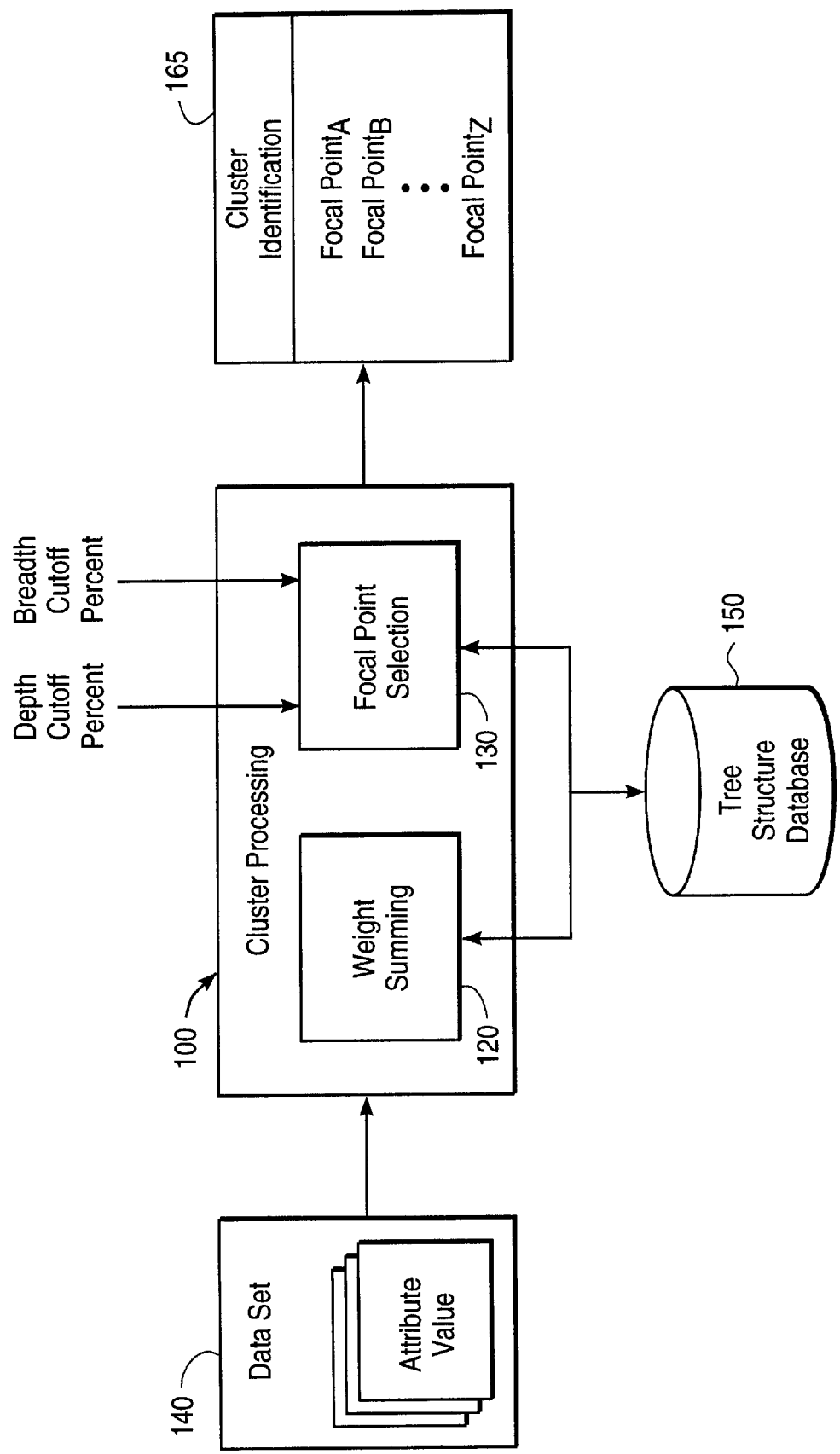
FIG. 1 is a block diagram illustrating one embodiment for cluster processing in accordance with the present invention.

FIG. 1 is a block diagram illustrating one embodiment for cluster processing in accordance with the present invention. In general, a data set 140, which includes a plurality of attributes, is input to cluster processing 100. In response, the cluster processing 100 generates "focal points" in cluster identification 165 that reflect an attribute most representative of the attributes in data set 140 as depicted in a tree structure database 150. The tree structure database 150 models a particular application for which the cluster processing 100 is applied. Specifically, the tree structure database 150 contains a plurality of nodes, wherein the nodes are connected to depict the relationship among the nodes for the model.

The cluster processing of the present invention is a general purpose method for solving computer-based categorizational problems. The data set 140 may comprise information or data underlying any type of system for which the cluster processing is applied. As an example, cluster processing has application for use in control theory, medical diagnostics, criminal profig, and fraud detection. The general-purpose clustering techniques also has application for use in terminological systems. In terminological systems, the data set 140 comprises a plurality of terms, which may represent themes or topics, input to the cluster processing 100 to ascertain a central or focus topic or theme. One embodiment for a terminological system is described more fully below.

As shown in FIG. 1, for this embodiment, cluster processing 100 includes weight summing 120 and focal point selection 130. In general, weight summing 120 maps attributes from the data set 140 to nodes of the tree database 150, and generates quantitative values for those nodes for use in focal point selection 130. The focal point selection 130 utilizes the weighed set of nodes from the tree structure database 150, and selects a focal point for one or more clusters of nodes. As shown in FIG. 1, focal point selection 130 includes two adjustable parameters: depth cutoff percent and breadth cutoff percent. The depth cutoff percent determines the level of detail or depth within the tree structure database 150 that the focal point selection 130 considers when selecting the focal point. The breadth cutoff percent is a parameter that indicates the level of breadth to consider nodes on the tree structure database 150. These tunable parameters are discussed more fully below in conjunction with a description of the focal point selection processing 130.

Figure 2:
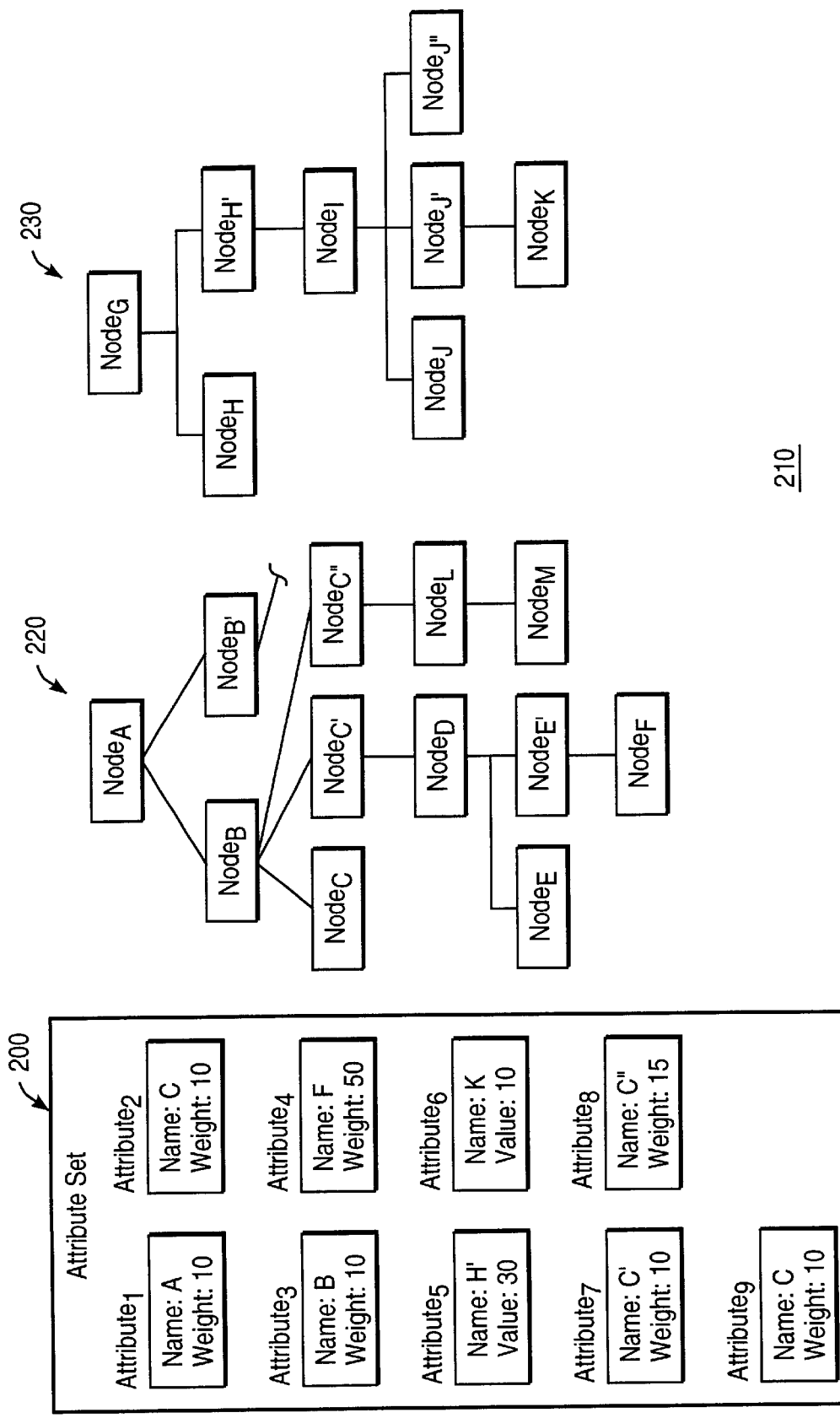
FIG. 2 illustrates an example of mapping a data set to a portion of a tree structure.

FIG. 2 illustrates an example of mapping a data set to a portion of a tree structure. An example data set 200 contains nine attributes (attribute$_1$, attribute$_2$, ... attribute$_9$). Each attribute includes a name to identify that attribute. For purposes of explanation, the attributes of data set 200 are designated A, C, D, C', C", F, H' and K. In addition, an attribute includes a value. As described in the terminological system, a value may indicate a strength or weight associated with that attribute (e.g., theme weight). In general, the value provides a quantitative measure for the associated attribute. For the example of FIG. 2, attribute$_1$ has a value of 10; attribute$_2$ has a value of 10; attribute$_3$ has a value of 10, etc.

An example portion of a tree structure is reproduced in FIG. 2, and labeled 210. Tree structure 210 includes two independent portions, labeled 220 and 230. The tree hierarchy 220 contains node$_A$ as the highest level node in the hierarchy, and includes six levels total. Tree hierarchy 230, which includes five levels, contains node$_G$, in the highest level, and contains node$_K$ in the lowest level. As described more fully below, in a terminological system the nodes represent terms or concepts, and the hierarchical relationships among the concepts depict semantic, linguistic, and usage associations among those concepts.

For purposes of nomenclature, the tree structure 210 includes both ancestor relationships and descendant relationships. An ancestral relationship includes all of those nodes linked to the subject node that appear higher in the hierarchy. For example, node$_D$ has an ancestral relationship to node$_{C'}$, node$_B$, and node$_A$. Descendant relationships for a subject node include all nodes beneath the subject node in a tree hierarchy. For example, node$_{C'}$ has a descendant relationship with node$_D$, node$_{E'}$, node$_E$ and node$_F$. Also, nodes may be defined as having parent-child, grandparent-child, grandchild-child, etc. relationships. For example, node$_I$ is the grandchild node of node$_G$ in tree structure 230.

Figure 3:
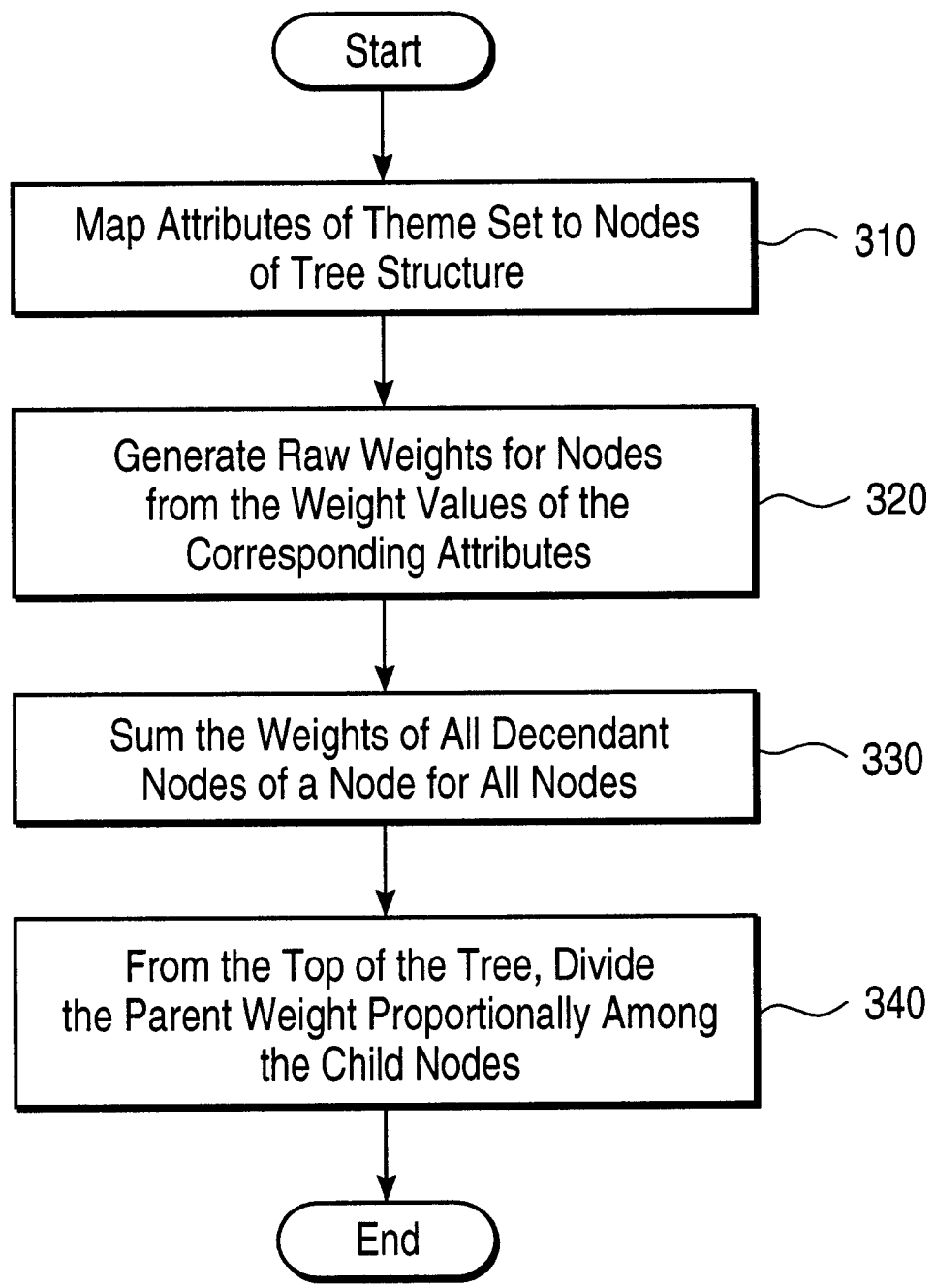
FIG. 3 is a flow diagram illustrating one embodiment for weight summing for use in the clustering techniques of the present invention.

FIG. 3 is a flow diagram illustrating one embodiment for weight summing for use in the clustering techniques of the present invention. As shown in block 310, attributes of the data set are mapped to nodes of the tree structure. Table 1 shows, for each cluster node (i.e., a node for which an attribute is mapped), and accumulated values for the corresponding cluster nodes for the example data set 200 of FIG. 2.

TABLE 1

| Attribute Name | Value (Weight) |
|---|---|
| A | 10 |
| C | 20 |
| D | 10 |
| F | 50 |
| H' | 30 |
| K | 10 |
| C' | 10 |
| C" | 15 |

To map attributes of a data set to a tree structure, attribute names are compared with node names to identify matches. For the example of FIG. 2, attribute$_1$, named "A", is mapped to or associated with node$_A$ in tree structure 220. Similarly, attribute$_5$ is mapped to tree hierarchy 230 by associating the name "H'" with node$_{H'}$. As shown in block 320 of FIG. 3, weight summing processing 120 (FIG. 1) generates raw weights for nodes by summing all of the weight values of the corresponding attributes. This step includes ascribing the values for each attribute that maps to the node as a raw weight for the corresponding node. If a data set contains two or more attributes having the same name, then the raw weight is a sum of all of those attribute values. Table 1 shows, for each attribute, the attribute name, as mapped to the tree structure, and a column for the corresponding value for the example of FIG. 2.

In addition to accumulating raw weights, the weight summing processing 120 (FIG. 1) also calculates a descendant weight. As shown in block 330 of FIG. 3, weights of all descendant nodes for nodes selected are summed to generate a descendant weight. Table 2 shows, for each attribute of example data set 200, a descendant weight. Specifically, the descendant weight is determined by adding all of the raw weights for all of the child nodes as well as the raw weights for the descendants of the subject node. For example, a descendant weight of one hundred and five (105) for attributes$_1$ is calculated by summing values for all of its descendants (i.e., 20+10+15+10+50 from nodes$_{C, C', C'', D \text{ and } F}$, respectively). Table 2 shows, for each cluster node, the name associated with the node and its descendant value.

TABLE 2

| Node Name | Descendant Weight |
|---|---|
| C' | 60 |
| C" | 0 |
| A | 105 |
| C | 0 |
| D | 50 |
| F | 0 |
| H' | 10 |
| K | 0 |

As shown in block 340 of FIG. 3, an ancestor weight, which measures how much weight is from the ancestors of the subject node (i.e., the node under analysis), is calculated. In one embodiment, to calculate an ancestor weight, the parent weight (i.e., the raw weight plus the nodes parent weight) is divided proportionally among the child nodes based on the relative weight of the child nodes (i.e., relative weight of the raw weight plus the child node's descendant weight). Table 3 shows, for each node, the node name and corresponding ancestor weight.

TABLE 3

| Node Name | Ancestor Weight |
|---|---|
| C' | 6.7 |
| C" | 1.4 |
| A | 0 |
| C | 1.9 |
| D | 11.9 |
| F | 21.9 |
| H' | 0 |
| K | 0 |

For the example of FIG. 2, $node_C$ has an ancestor weight of approximately 1.9, $node_{C'}$ has an ancestor weight of approximately 6.7, and $node_{C''}$ has an ancestor weight of approximately 1.4, from the raw weight of $node_A$. $Node_D$ has a total ancestor weight of 11.9 from the raw weight of $node_{C''}$ plus the ancestor weight of $node_{C'}$.

Accordingly, the output of weight summing 120 (FIG. 1) provides three weights. A raw weight that represents the weight from the attributes of the data set for clustering; a descendant weight that measures the amount of weight from the descendants of a particular node; and an ancestor weight that measures the amount of weight from the ancestors of a particular node.

Figure 4:
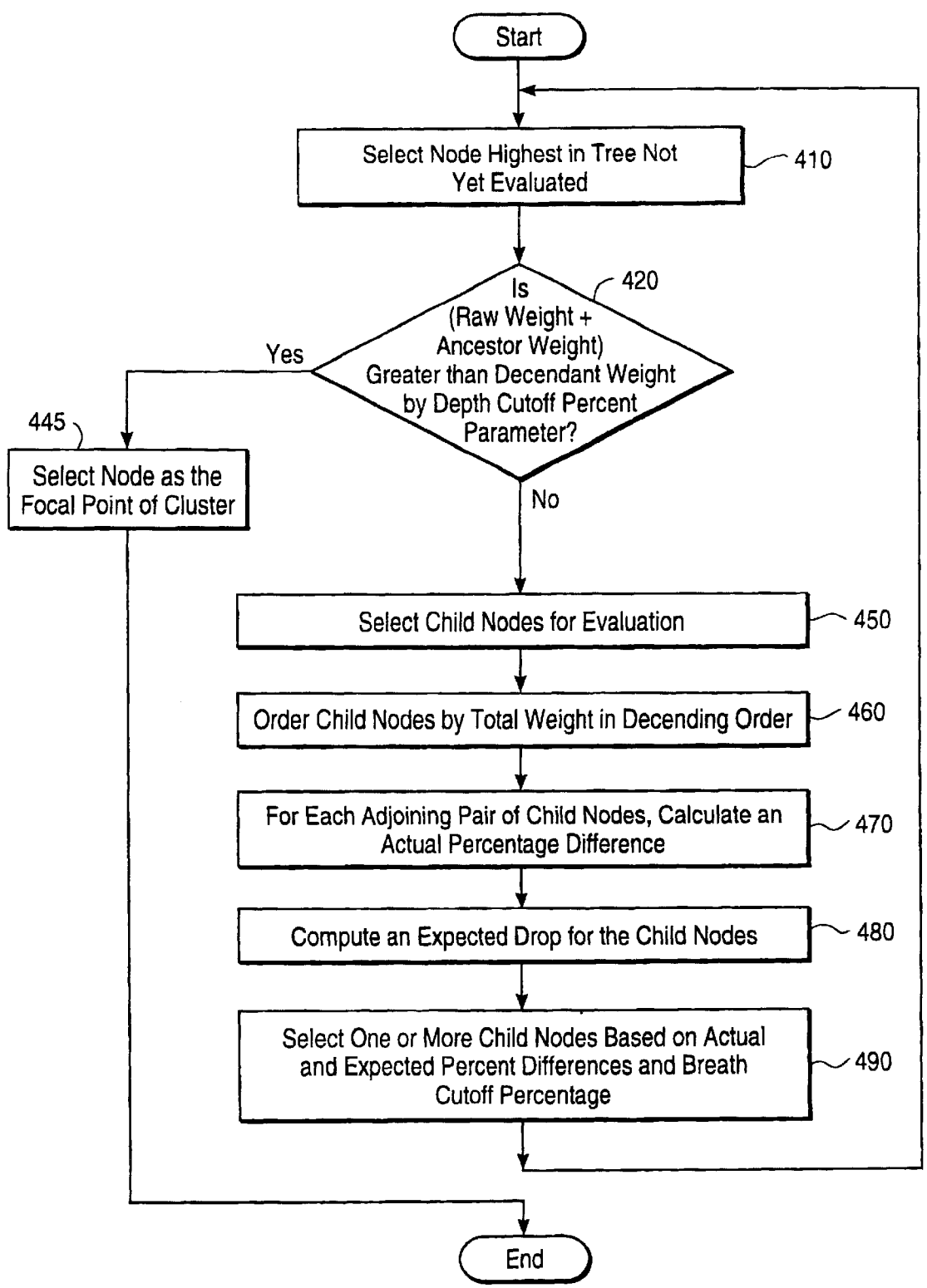
FIG. 4 is a flow diagram illustrating one embodiment for focal point selection in accordance with the clustering techniques of the present invention.

FIG. 4 is a flow diagram illustrating one embodiment for focal point selection in accordance with the clustering techniques of the present invention. As shown in block 410, the process begins by selecting the node highest in the tree and not yet evaluated. As shown in blocks 420 and 445, if the percent difference between the raw weight plus the ancestor weight to the descendent weight is greater than the depth cut-off percent parameter, then that node is selected as the focal point for the cluster. Table 4 shows raw plus ancestor weights and descendant weights for each node of the set of nodes in the example of FIG. 2.

TABLE 4

| Node Name | Raw Weight + Ancestor Weight | Descendant Weight |
|---|---|---|
| A | 10 | 105 |
| C | 21.9 | 0 |
| C' | 16.7 | 60 |
| C" | 16.4 | 0 |
| D | 26.7 | 50 |
| F | 76.7 | 0 |
| H' | 30 | 0 |
| K | 10 | 0 |

For this example, the depth cut-off percent parameter is fifty-five percent (55%). Starting with $node_A$ in tree structure 220, the percentage of the raw plus ancestor weight to the descendant weight, 105, is less than the percentage cut-off weight of fifty-five percent (55%). Thus, for tree structure 220, $node_A$ is not selected as the focal point for this cluster. In tree structure 230, the process compares the percentage of the raw plus ancestor weight of $node_{H'}$ to the descendant weight of $node_{H'}$. In this case, if the depth cut-off percent parameter is less than 66%, then $node_{H'}$ is selected as the focal point of the cluster on tree structure 230.

As shown in blocks 420 and 450 of FIG. 4, if the percentage of the raw plus ancestor weight of the selected node to the descendant weight is less than the depth cut-off percent parameter, then child nodes, in that tree structure, are evaluated. As shown in blocks 450 and 460, the child nodes are selected and ordered, in a descending order, by total weight (i.e., raw weight+ancestor weight+descendant weight). For the tree structure 220 of FIG. 2, the descending order for the remaining child nodes is:

$Node_{C'}$ (81.9), $Node_C$ (21.9), and $Node_{C''}$ (16.4).

As shown in block 470 of FIG. 4, the percent of the smaller of the pair to the larger (e.g., an actual percentage difference) is calculated for each adjoining pair of child nodes. For the tree structure 220 of FIG. 2, C' is twenty-six percent (26%) of the value of $node_C$ and C" is seventy four percent (74%) of the value of $node_{C'}$. As shown in block 480 of FIG. 4, an average expected percent difference or drop for all of the child nodes is computed as 100–(100/# Items left on the list) (e.g., a thirty three and a third (33.3%) for the example of FIG. 2).

In general, the focal point selection 130 (FIG. 1) utilizes the calculated percent differences and the breadth cut-off percentage to select child nodes as candidates for the focal point node, as shown in block 490 of FIG. 4. This process may result in selection of more than a single focal node from the list of child nodes. The selected child nodes are utilized in the process starting again at block 410 as shown in FIG. 4.

The following algorithm discloses, in pseudo-code, one embodiment for selecting child nodes as cluster nodes for step 490 of FIG. 4.

```
/**sort the immediate children by there child_total_
    weight**/
total_weight=sum of the child_total_weight
weigh_so_far=0
for each immediate child
{
    weight_so_far+=child_total_weight;
    exp_drop_percent=100-(100/number_of_
        remaining_children);
    if ((1-((total_weight-weight_so_far /total_weight)
        >breadth_cutoff_percent AND
        (1-((current_child_weight-next_child_weight)/
            current_child_weight))<exp_drop_percent
    {
        send child node to 410 (start) of flow diagram
    }
}
```

For the tree example 220 of FIG. 2, because the percent difference between $node_C$ and $node_{C'}$ is less than the average expected percent difference, the breadth cut-off percentage is used to determine whether $node_C$ and $node_{C''}$ are part of the cluster. As shown as the line and arrow connecting blocks 490 and 410 in FIG. 4, the process to select a focal point node is repeated using the modified set of nodes that remain as part of the cluster.

Clustering Techniques for Terminological Systems

Figure 5:
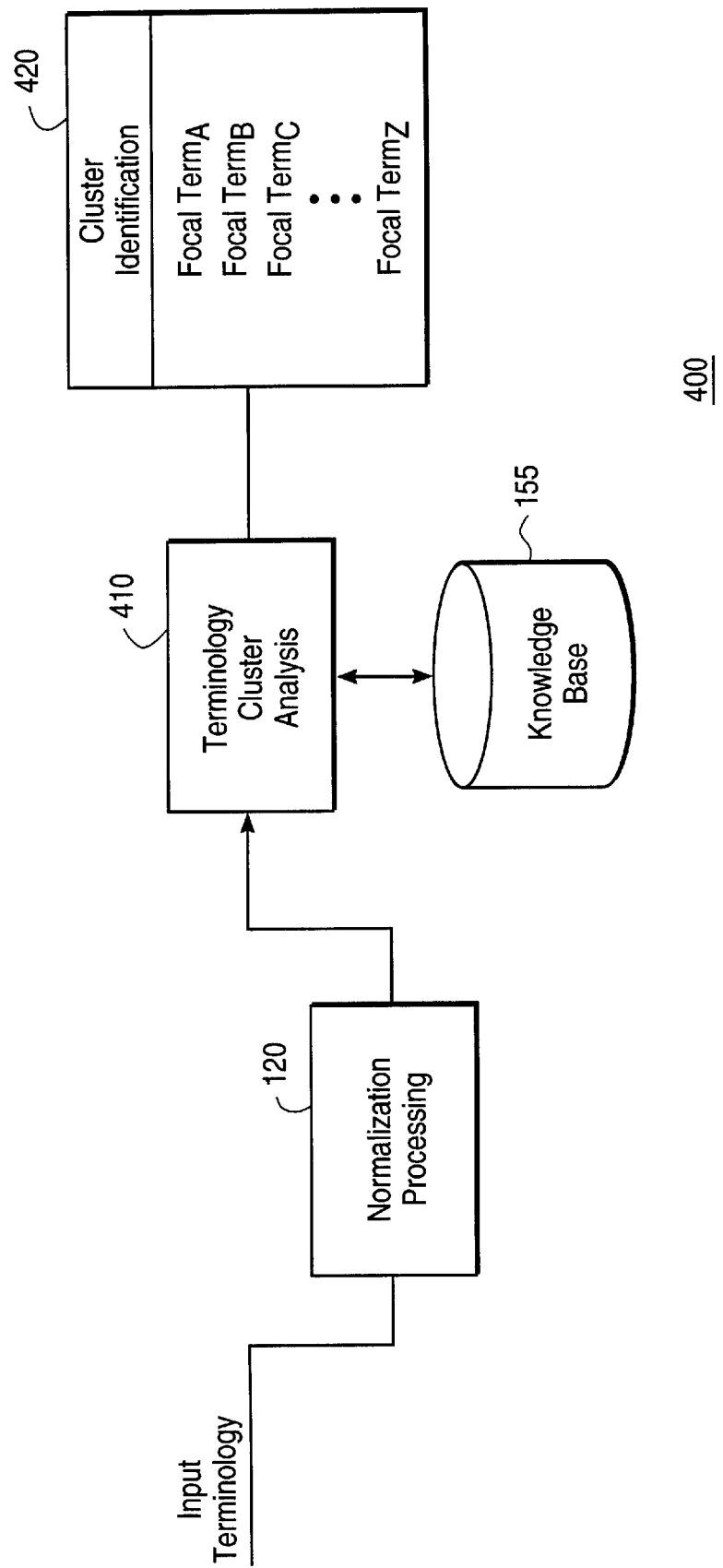
FIG. 5 is a block diagram illustrating one embodiment for cluster analysis in a terminological system.

FIG. 5 is a block diagram illustrating one embodiment for cluster analysis in a terminological system. A terminological system 400 includes terminology cluster analysis 410. In general, terminology cluster analysis 410 receives terms (e.g., words in phrases) and generates, as output, 1 or more focal terms that correspond to clusters of the input terminology. The terminology cluster analysis 410 utilizes the processes of cluster processing 100, described above, to identify the focal terms for the input terminology. The terminology cluster analysis 410 utilizes, as a tree structure database, a knowledge base 155. In general, the knowledge base 155 includes a plurality of nodes that comprise concepts and categories, expressed as terminology augmented to include associations among the concepts and categories.

In one embodiment, the knowledge base 155, may contain classification and contextual information based on processing and/or compilation of thousands of documents or may contain information based on manual selection by a linguist. A description of the knowledge base 155 is described more fully below in the section "Knowledge Base."

For this embodiment of cluster analysis, terminology is input to normalization processing 120. In general, normalization processing 120 generates linguistic variants, including canonical forms, to pre-process the terminology for operation with the concept names of the knowledge base 155. A complete description of normalization processing is described more fully below. The canonical forms and linguistic variants of the input terminology are mapped to categories of the knowledge base 155. For example, for the input terminology "computer industry", the terminology cluster analysis 410 maps the term "computer industry" to the category "computer industry" in knowledge base 155. The selection of focal term in the terminology cluster analysis 410 is analogous to the processes described above for cluster processing 100.

Knowledge Base

In general, the knowledge base 155 is the repository for all knowledge about languages and about the concrete and abstract worlds described by language in human discourse. The knowledge base 155 contains two major types of data: language specific data necessary to describe a language used for human discourse, and language independent data necessary to describe the meaning of human discourse.

In general, in normalization processing, given a term, the goal is to analyze and manipulate its language dependent features until a language independent ontological representation is found. The knowledge base 155 consists of concepts, general categories, and cross-references. Concepts, or detailed categories, are a subset of the canonical forms determined by the language dependent data. These concepts themselves are language independent. In different languages their text representations may be different; however, these terms represent the universal ontological location. Concepts are typically thought of as identification numbers that have potentially different representations in different languages. These representations are the particular canonical forms in those languages. General categories are themselves concepts, and have canonical form representations in each language. These categories have the additional property that other concepts and general categories can be associated with them to create a knowledge hierarchy. Cross references are links between general categories. These links augment the ancestry links that are generated by the associations that form a directed graph.

The ontology in the knowledge base 155 contains only canonical nouns and noun phrases, and it is the normalization processing 120 that provides mappings from non-nouns and non-canonical nouns. The organization of the knowledge base 155 provides a world view of knowledge, and therefore the ontology actually contains only ideas of canonical nouns and noun phrases. The text representation of those ideas is different in each language, but the ontological location of the ideas in the knowledge base 155 remains the same for all languages.

The organizational part of the knowledge base 155 is the structured category hierarchy comprised at the top level of general categories. These categories represent knowledge about how the world is organized. The hierarchy of general categories is a standard tree structure. In one embodiment, a depth limit of sixteen levels is maintained. The tree organization provides a comprehensive structure that permits augmentation of more detailed information. The tree structure results in a broad but shallow structure. The average depth from tree top to a leaf node is five, and the average number of children for non-leaf nodes is 4.5.

There are two types of general categories: concrete and abstract. This distinction is an organizational one only and it has no functional ramifications. A concrete category is one that represents a real-world industry, field of study, place, technology or physical entity. The following are examples of concrete categories: "chemistry", "computer industry", "social identities", "Alabama", and "Cinema." An abstract category is one that represents a relationship, quality, fielding or measure that does not have an obvious physical real-world manifestation. The following examples are abstract categories: "downward motion", "stability", "stupidity, foolishness, fools", "mediation, pacification", "texture", and "shortness."

Many language dependent canonical forms mapped to the language independent concepts stored as the knowledge base 155. The concept is any idea found in the real world that can be classified or categorized as being closely associated with one and only one knowledge base 155 general category. Similarly, any canonical form in a particular language can map to one and only one concept. For example, there is a universal concept for the birds called "cranes" in English, and a universal concept for the machines called "cranes" in English. However, the canonical form "cranes" does not map to either concept in English due to its ambiguity. In another language, which may have two different canonical forms for these concepts, mapping may not be a problem. Similarly, if "cranes" is an unambiguous canonical form in another language, then no ambiguity is presented in mapping.

Cross references are mappings between general categories that are not directly ancestrally related, but that are close to each other ontologically. Direct ancestral relationship means parent-child, grandparent-grandchild, great grandparent-great grandchild, etc. Cross references reflect a real-world relationship or common association between the two general categories involved. These relationships can usually be expressed by universal or majority quantification over one category. Examples of valid cross references and the relationships are shown in Table 5.

TABLE 5 oceans --> fish (all oceans have fish)
belief systems --> moral states (all belief systems address moral states)
electronics --> physics (all electronics deals with physics)
death and burial --> medical problems (most cases of death and burial are caused by medical problems)

Cross references are not automatically bidirectional. For example, in the first entry of Table 5, although oceans are associated with fish, because all oceans have fish, the converse may not be true since not all fish live in oceans. The names for the general categories are chosen such that the cross references that involve those general categories are valid with the name or label choices. For example, if there is a word for fresh water fish in one language that is different than the word for saltwater fish, the oceans to fish cross reference is not valid if the wrong translation of fish is used. Although the knowledge base 155 is described as cross linking general categories, concepts may also be linked without deviating from the spirit and scope of the invention.

Figure 6:
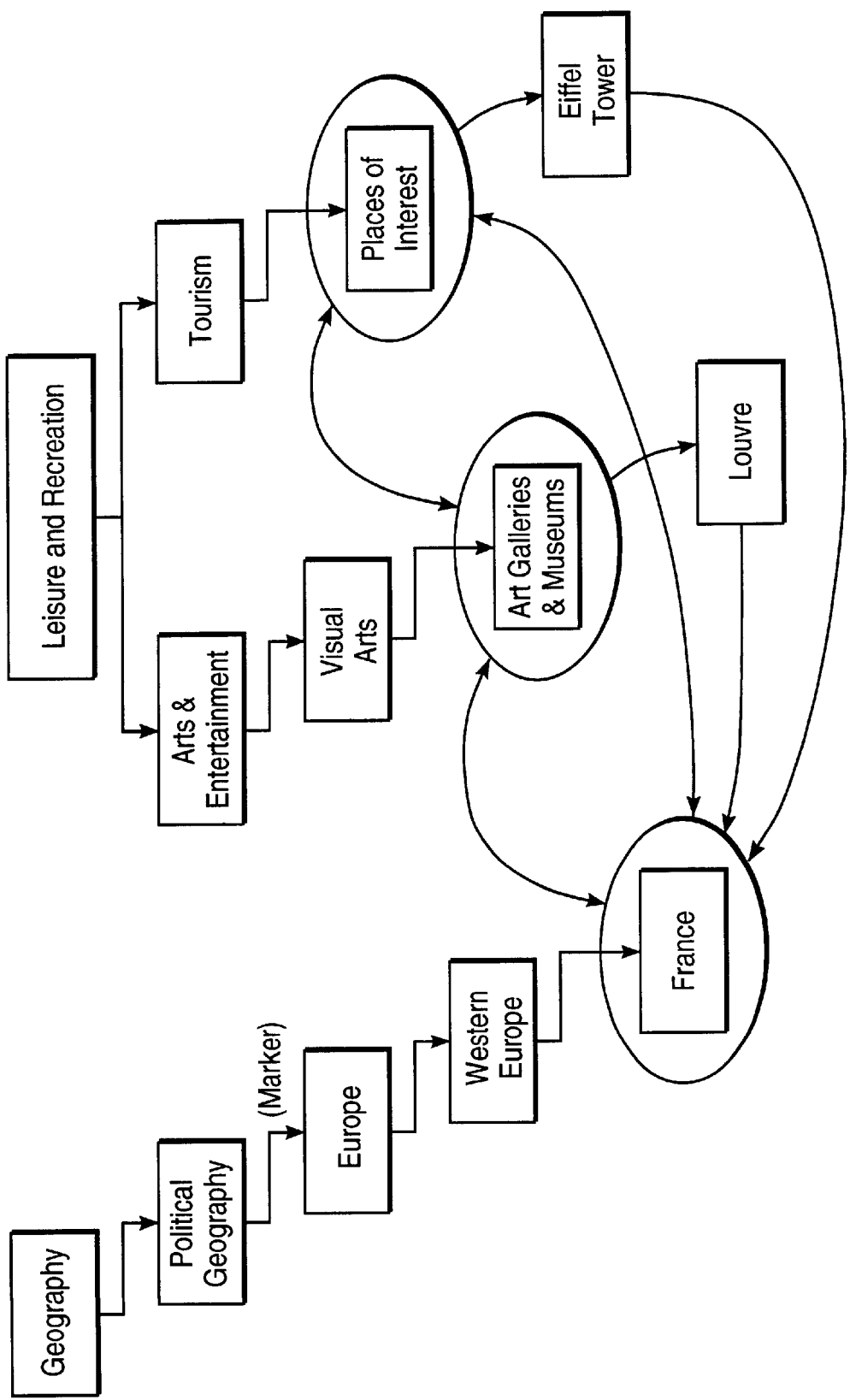
FIG. 6 illustrates an example portion of a knowledge base, is hierarchically arranged, including cross references and links among categories and terms.

FIG. 6 illustrates an example portion of a knowledge base, hierarchically arranged, including cross references and links among categories and terms. The classification hierarchy and notations shown in FIG. 6 illustrate an example that classifies a document on travel or tourism, and more specifically on traveling to France and visiting museums and places of interest. As shown in FIG. 6, the classification categories (e.g., knowledge catalog 560) contains two independent static ontologies, one ontology for "geography", and a second ontology for "leisure and recreation." The "geography" ontology includes categories for "political geography", "Europe", "Western Europe", and "France." The categories "arts and entertainment" and "tourism" are arranged under the high level category "leisure and recreation." The "visual arts" and the "art galleries and museums" are subcategories under the "arts and entertainment" category, and the category "places of interest" is a subcategory under the category "tourism."

The knowledge base 155 is augmented to include liking and cross referencing among categories for which a linguistic, semantic, or usage association has been identified. For the example illustrated in FIG. 6, the categories "France", "art galleries and museums", and "places of interest" are cross referenced and/or linked as indicated by the circles, which encompass the category names, as well as the lines and arrows. This linking and/or cross referencing indicates that the categories "art galleries and museums" and "places of interest" may appear in the context of "France."

For this example, the knowledge base 155 indicates that the Louvre, a proper noun, is classified under the category "art galleries and museums", and further associates the term "Louvre" to the category "France." Similarly, the knowledge base 155 indicates that the term "Eiffel Tower" is classified under the category "places of interest", and is also associated with the category "France."

The knowledge base 155 may be characterized, in part, as a directed graph. The directed graph provides information about the linguistic, semantic, or usage relationships among categories, concepts and terminology. The "links" or "cross references" on the directed graph, which indicate the associations, is graphically depicted in FIG. 6 using lines and arrows. For the example shown in FIG. 6, the directed graph indicates that there is a linguistic, semantic, or usage association among the concepts "France", "art galleries and museums", and "places of interest."

Normalization Processing

In normalization processing 120, information is extracted from morphology section 771 of the content processing system 110. Starting with the first input term, normalization processing 120 determines whether a canonical form exists for the input term. In general, normalization refers to a noun form for a non-noun based word. Different languages have different criteria for defining the canonical form of a noun. The canonical or base form of a term is typically ascertained by looking up the term in the lexicon 760. If the transformation from token to canonical or base form cannot be accomplished by looking up the token in the lexicon 760, morphological processing can be executed on the token in an attempt to create the base form from some set of transformations. This is a language specific process, and the quality of the base form so generated is directly related to the quality of the morphology. If the term is a noun, then it has a canonical form. In rare cases, morphology can be executed on the noun to find its canonical form.

Words with suffixes, such as "tion" and "ity", are the preferred canonical forms for query processing. In some cases, morphology unrelated forms of a noun with a bad suffix are chosen as canonical forms as long as their meaning is preserved. Table 6 lists examples of the preferred canonical form of a noun and a list of alternate forms for the noun indented.

TABLE 6 beauty
  beautifulness
  beautiousness
  beauties
scamps
  scampishness
  scampishnesses
  scamp
stupidity
  dull-headedness
  dull-headednesses
  lame-brainedness
  lame-brainednesses
  stupidities
cooperation
  cooperating Exceptions to this rule are nouns that have become very common in their "ness", "ing" or "bility" forms, or are not readily separable from their suffixes such as "sickness", "fishing" and "notability."

Similar to non-noun based forms, canonical nouns do not have mood-changing prefixes. Table 7 lists three non-noun base forms, in their canonical forms, with non-mood-changing prefixes indented.

TABLE 7 spots
  unspottedness
  spottedness
professionalism
  unprofessionalism
taste
  distastefulness
  tastefulness Exceptions to this rule are, as with non-noun based forms, those nouns which, when the prefix is removed, do not retain their meaning or even their part of speech. Examples of these exceptions are "distension", "exploration", or "unction."

If the canonical form exists, then the canonical form is used instead of the input term as the token for terminology cluster analysis. Normalization processing 120 then ascertains whether the input term is a noun. In one embodiment, the lexicon 760 indicates whether the input term is a noun.

In English, proper nouns are defined as nouns that represent specific people, places, days and months, organizations, businesses, products, religious items, or works of art. Proper nouns initial letters are almost always capitaie. Exceptions to capitalization are rare, and are usually for artistic or attention getting reasons. A proper noun phrase is a noun phrase that begins and ends with a proper noun. Table 8 lists valid proper nouns or noun phrases.

TABLE 8

Chicago
IBM
Carlton Pisk
October
International Business Machines Corporation
International Society of Engineers
e.e. cummings
Judgement Day Table 9 lists noun phrases that are not valid proper noun phrases.

TABLE 9

California condor
heart of Texas
AWOL (this is an acronym of a common noun phrase)

In very rare cases, proper nouns or noun phrases pluralize. If they do, the plural form is canonical. For example, "Texans" is the canonical form of "Texan." Also, "Geo Prisms" is the canonical form of "Geo Prism."

When a proper noun phrase is represented by an acronym, the canonical form is a phrase consisting of the acronym, without periods, followed by a hyphened followed by the full unabbreviated noun phrase. Each possible form of the acronym and the phrase it stands for becomes the alternate form of the new canonical form. Table 10 lists the canonical form first with the non-exhaustive examples of alternate forms indented.

TABLE 10

IBM - International Business Machines Corporation
IBM
I.B.M.
International Business Machines Corporation
International Business Machines Corp.
IBM Corp.
MISL - Major Indoor Soccer League
MISL
M.I.S.L.
Major Indoor Soccer League Commercial names also appear as input terms. There are many alternate forms for most commercial proper noun phrases. Those phrases, although do not have acronyms associated with them, still require a consistent canonical form representation. For English proper noun phrases, Table 11 lists a set of rules for commercial names.

TABLE 11

All abbreviations will be spelled out
Inc. --> Incorporated
Int'l. --> International
Org. --> Organization
Hyphens will be preferred where there is a choice
Long Term --> Long-Term
Alka Seltzer --> Alka-Seltzer
Ampersands will be used in place of the word 'and'
Cahill, Gordon and Reindel --> Cahill, Gordon & Reindel
Growth and Income --> Growth & Income The rules, set forth in Table 11, when combined in proper noun phrases with multiple features, create many alternate forms from a single canonical form. Since there is no way to predict how a company or product is going to be referred to in a quiery, thi proliferation of alternate forms is necessary to achieve consistent representations whenever possible. Table 12 lists the canonical form of a corporation, and then continue with an indented list of alternate forms.

TABLE 12

Cahill, Gordon & Reindel
Cahill, Gordon and Reindel
Cahill, Gordon, & Reindel
Cahill, Gordon, and Reindel
Commodore International, Incorporated TABLE 12-continued Commodore, Inc.
Commodore Inc.
Commodore, Inc
Commodore, Incorporated
Commodore Incorporated
Commodore International
Commodore International, Inc.
Commodore International Inc.
Commodore International, Inc
Commodore International Inc
Commodore International Incorporated
Commodore Int'l., Inc.
Commodore Int'l., Inc
Commodore Int'l. Inc.
Commodore Int'l. Inc
Commodore Int'l. Incorporated
Commodore Int'l., Incorporated
Commodore Int'l, Inc.
Commodore Int'l, Inc
Commodore Int'l Inc.
Commodore Int'l Inc
Commodore Int'l Incorporated
Commodore Int'l, Incorporated The canonical forms of common noun phrases are created using the same rules as single common nouns and proper noun phrases. The mass singular form is preferred, and the count plural form is next. Any abbreviations, acronyms, hyphens or ampersands are handled as they are in proper noun phrases. Table 13 lists canonical forms and common noun phrases, indented, that pertain to the canonical form.

TABLE 13 atomic bombs
A-bomb
A bomb
A-bombs
A bombs
atom bomb
atom bombs
atomic bomb
satirical poetry
satirical poetries Some noun phrases refer to the same entity, and are referred to as "multiple referents." Cases where different nouns or noun phrases refer to exactly the same entity, then one noun is usually selected as the canonical form, and the other nouns considered alternate forms. Table 14 lists noun and noun phrases that refer to the same entity, wherein the canonical form is left justified and the alternate forms are indented.

TABLE 14

Mark Twain
Samuel Clemens
Samuel L Clemens
Samuel L. Clemens
Samuel Longhorn Clemens
angelfish
angelfishes
scalare
scalares If the input term is not a noun, then a determination is made as to whether the input term has a nominal form. If the input term has a nominal form, then the nominal form is used as a token, instead of the input term. If the term does not have a nominal form, then the input term is used as the token.

If the term is a noun, then a further inquiry determines whether the input term is a mass noun. The preferred canonical form of a noun or noun phrase in English is its mass singular form. Nouns, which are mass only nouns, such as "chess" or "goats milk" have only one form, and this is the canonical form. However, most nouns that are mass nouns are also count nouns. The canonical form of count nouns is typically the mass singular form. Examples of these types of nouns are "description", "fish", and "cheese." The count plural forms of these nouns ("descriptions", "fishes", and "cheeses") are referred to as alternate forms, and are transformed to the mass singular form for use as tokens.

If the input term is not a mass noun, then the normalization processing determines whether the input term has a plural form. If a noun or a noun phrase does not have a mass sense, then its canonical form is the count plural form. Nouns such as "chemical", "personal computer", and "California Condor" are alternate forms of the canonicals "chemicals", "personal computers", and "California Condors", respectively. If the plural form does exist, then the plural form is used as the token for cluster analysis. If the plural form does not exist, then the input term is used as the token. Whether mass or count, there are several noun candidates for canonical form which are very close in meaning, but which have various levels of desirability based on morphology. Typically, nouns ending in "ness", "ing", and "bility" do not make very good canonical forms and are usually listed as alternate forms of more basic nouns. Unsuffixed forms are preferred. Normalization processing is repeated for each input term.

The normalization processing 120 also includes processes to eliminate the case sensitivity problem, when appropriate. The content processing system 110 includes a lexicon 760. The lexicon 760 contains information (e.g., definitional characteristics) for a plurality of words. One definitional characteristic defines the part of speech for the corresponding word. For example, the lexicon 760 identifies whether a word is a common noun. Furthermore, the lexicon 760 identifies the amount of content carrying information for a corresponding word. In general, the normalization processing 120 utilizes the definitional characteristics in the lexicon to determine whether to generate a lower case term from an upper case term when input as an input term. In one embodiment, the normalization processing 120 generates lower case terms if the corresponding upper case term is both a common noun and a content carrying word. Names, which are proper nouns, are not converted. For input terms converted, both the upper case term and the lower case term are used to process the query. Although certain upper case terms are converted to lower case terms, the original upper case query term is considered more relevant to the original query than the lower case term.

Terminological Learning

Figure 7:
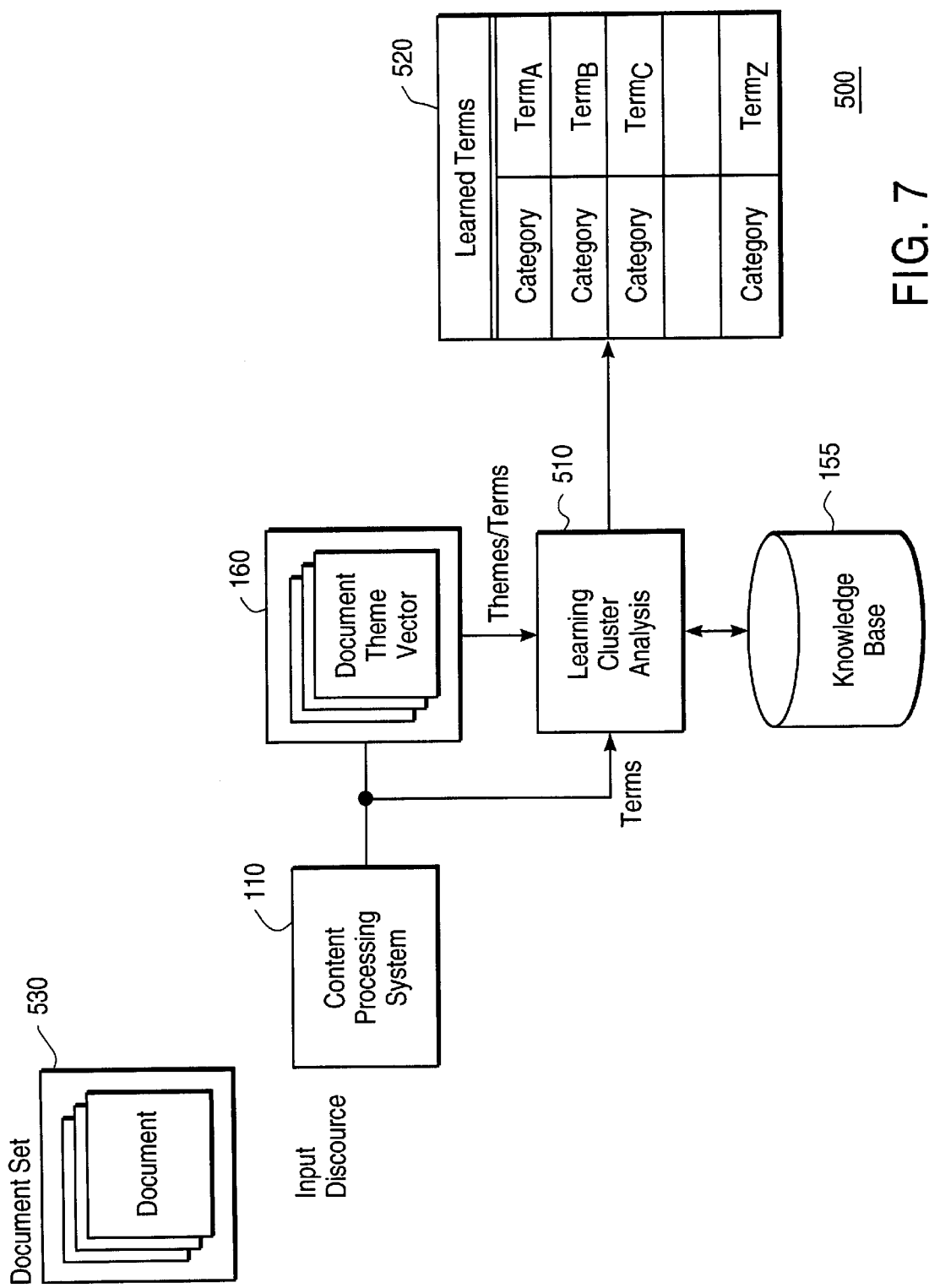
FIG. 7 illustrates one embodiment for a leaning system that incorporates the cluster analysis of the present invention.

The cluster analysis processing of the present invention has application for use in a terminological leaning system. FIG. 7 illustrates one embodiment for a learning system that incorporates the cluster analysis of the present invention. In general, a leaning system 500 "learns" terminology in the context of a plurality of documents (e.g., document set 530) by identifying categories in the knowledge base 155 that define the meaning of the terminology. For this application of cluster analysis, a leaning system 500 processes input discourse (e.g., a corpus of documents 530) and identifies a plurality of themes, and their respective weights, in the document theme vector 160. The document theme vector 160 further includes, for some themes, a category for which the theme is classified. For those themes and terms that do not have a classification, the learning system 500 identifies a category in the knowledge base 155 that best reflects the meaning of the term or theme.

As shown in FIG. 7, the learning system 500 incorporates a content processing system 110. In general, the content processing system 110 receives, as input, input discourse (e.g., documents, sentences, etc.), and generates, as output, a plurality of themes in the document theme vector 160. In general, the themes, expressed as words/phrases, represent the thematic content of the input discourse. In one embodiment, the content processing system 110 identifies the sixteen most important themes for each document processed. In addition to identifying the themes, the content processing system 110 generates theme weights or theme strengths for each theme identified.

Table 15 is an example document theme vector 160.

TABLE 15

Document Theme Vector

| Document Themes | Theme Weight | Classification Category |
|---|---|---|
| Theme$_1$ | 190 | (category$_a$) |
| Theme$_2$ | 110 | None |
| Theme$_3$ | 70 | (Category$_c$) |
| Theme$_4$ | 27 | (Category$_d$) |
| . | . | . |
| . | . | . |
| . | . | . |
| Theme$_n$ | 8 | (Category$_z$) |

Figure 8:
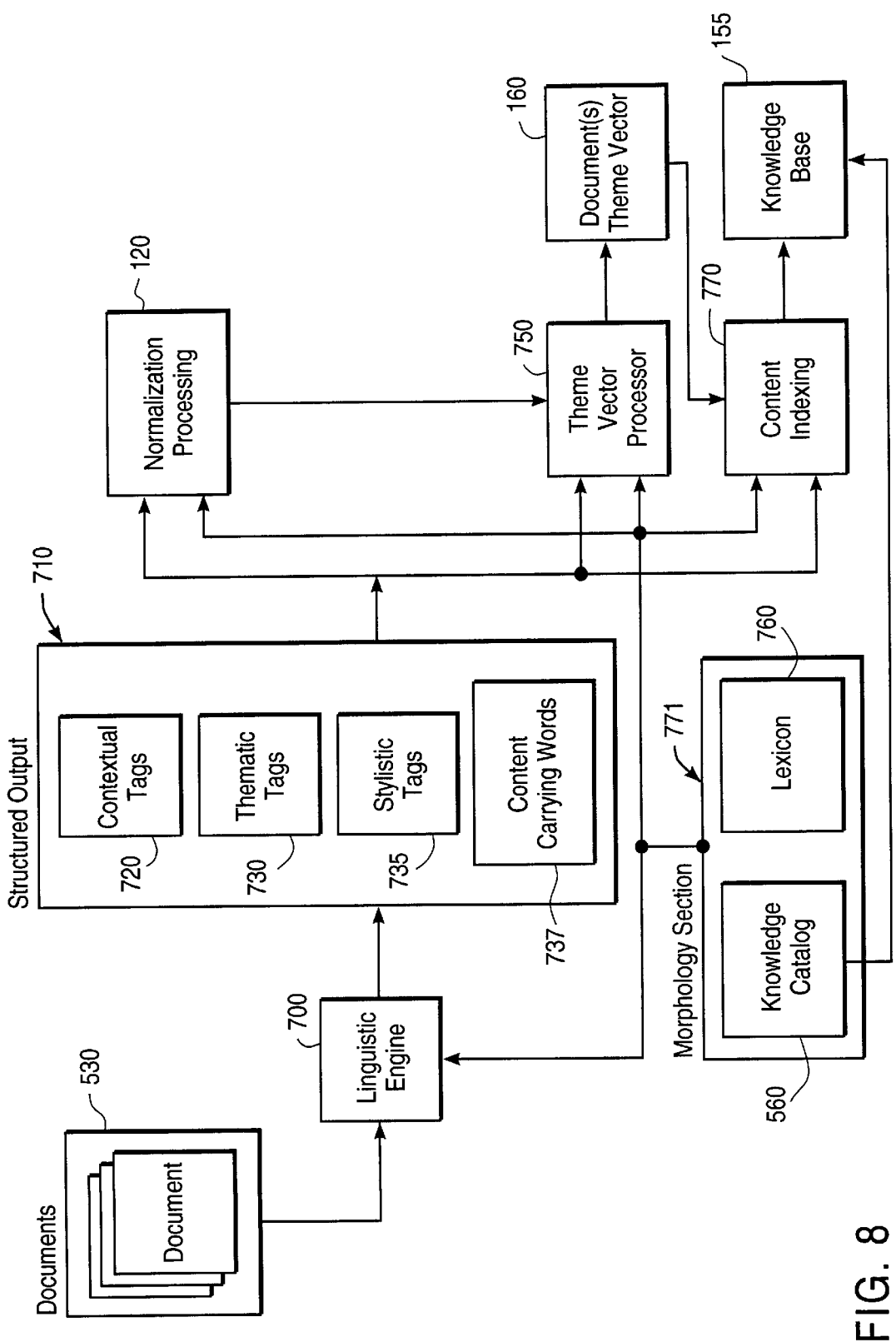
FIG. 8 is a block diagram illustrating one embodiment for a content processing system.

As shown in Table 15, a document theme vector 160 for a document includes a list of document themes, indicated in Table 1 by Theme$_1$–Theme$_n$. Each theme has a corresponding theme weight. The theme weight is calculated in the theme vector processor 750 (FIG. 8). The theme weight is a relative measure of the importance of the theme to the overall content of the document. For this embodiment, the larger the theme weight, the more important the theme is to the overall content of the document. The document theme vector 160 lists the document themes from the most important to the least important themes (e.g., theme$_1$–theme$_n$). The classification category is listed in the third column of the document theme vector shown in Table 15. For example, theme$_1$ is classified in category$_a$, and theme$_3$ is classified in category$_c$.

As shown in Table 15, the document themes are classified in a category in the knowledge base 155. However, not all themes are classified in a category of the knowledge base 155 because either the term or theme is not known, or the term is ambiguous (i.e., the term has more than a single meaning). For example, the document theme vector 160 may include the term "Oracle 7." The term "Oracle 7", a proper noun, was not classified in the content processing system 110 due to insufficient data (e.g., the context of the term was not determined in that stage of processing). For this example, the learning cluster analysis 510 analyzes categories classified for documents that contain the term "Oracle 7." From this analysis, the learning cluster analysis 510 determines that the term "Oracle 7" relates to computer software, and more particularly to relational databases. For this example, the category "relational databases", a subcategory of "computer software", is stored in the learned terms 510 as the category for the term "Oracle 7." Accordingly, the learning cluster analysis 510 disambiguates the context of a term by assigning a category for terms and themes previously unclassified.

The learning cluster analysis 510 "learns" the meaning of the terms, for which a corresponding category has not been identified, within the context of the corpus of documents 530 (e.g., within the context of the themes identified for the corpus of documents), and stores a category for a term in the learned terms 520. Specifically, the learning cluster analysis 510 applies the processes of cluster processing (FIGS. 1, 3 and 4), wherein a corpus of documents 530 (data set) with a plurality of themes (attributes) with theme weights (values) are processed to identify a category (focal point) from the knowledge base 155 (tree structure database). Thus, the leaning cluster analysis 510 performs cluster analysis on the themes and theme weights to identify focal themes (e.g., categories of the knowledge base 155) for one or more clusters in a document or set of documents.

Content Processing System

FIG. 8 is a block diagram illustrating one embodiment for a content processing system. In general, the content processing system 110 analyzes the document set 530 and generates the document theme vector 160. For this embodiment, the content processing system 110 includes a linguistic engine 700, normalization processing 740, a theme vector processor 750, and a morphology section 771. The linguistic engine 700 receives, as input, the document set 530, and generates, as output, the structured output 710. The linguistic engine 700, which includes a grammar parser and a theme parser, processes the document set 530 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. Pat. No. 5,694,523, inventor Kelly Wical, entitled "Content Processing for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phases for each sentence in the documents, the context of the documents is defined. The chaos loop processor stores information in the form of the contextual tags 720. U.S. Pat. No. 5,694,523, inventor Kelly Wical, entitled "Content Processing System for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 530. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. Pat. No. 5,694,523, inventor Kelly Wical, entitled "Content Processing System for Discourse", filed May 31, 1995.

As shown in FIG. 8, the morphology section 771 contains the knowledge catalog 560 and a lexicon 760. In one embodiment, the knowledge catalog 560 identifies categories for the document themes. For this embodiment, the knowledge catalog 560 contains categories, arranged in a hierarchy, that reflect a world view of knowledge. The categories of the knowledge catalog 560 are the base categories or nodes of the knowledge base 155. Appendix A of U.S. Pat. No. 5,694,523, inventor Kelly Wical, entitled "Content Processing System for Discourse", filed May 31, 1995, which is herein expressly incorporated by reference, is an example of a knowledge catalog for use in classifying documents.

In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. Pat. No. 5,694,523, inventor Kelly Wical, entitled "Content Processing System for Discourse", filed May 31, 1995.

The topics and content carrying words 737 are input to the normalization processing 120. As described above, normalization processing 120 processes the content carrying words for direct use with the knowledge catalog 560 and knowledge base 155. Specifically, the normalization processing 120 generates, as appropriate, the canonical form, the nominal or noun form of each content carrying word, as well as the count sense and mass sense of the word. Furthermore, the normalization processing 120 determines, from the knowledge catalog 560, which content carrying words are non ambiguous.

As shown in FIG. 8, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the normalization processing 120 are converted to the noun or nominal form. In general, the theme vector processor 750 presents a thematic profile of the content of each document (e.g., generates the document theme vector 160 including classifying the documents in the knowledge catalog 560). To accomplish this, the theme vector processor 750 determines the relative importance of the non ambiguous content carrying words in the document set.

In one embodiment, the theme vector processor 750 generates a list of theme terms, including words and phrases, and assigns a relative theme weight to each theme term. The theme vector processor 750, through use of the knowledge catalog 560, generates a theme concept for each theme term by mapping the theme terms to categories in the knowledge catalog 560. Thus, the theme concepts indicate a general topic or category in the knowledge catalog 560 to identify the content of each document. In addition, the theme vector processor 750 generates, for each theme term, an importance number, a theme weight, and an overall capacity weight of collective content importance.

In one embodiment, the theme vector processor 750 executes a plurality of heuristic routines to generate the theme weights for each theme. U.S. Pat. No. 5,694,523, inventor Kelly Wical, entitled "Content Processing System for Discourse", contains source code to generate the theme weights in accordance with one embodiment for theme vector processing. Also, a further explanation of generating a thematic profile is contained in U.S. Pat. No. 5,694,523, inventor Kelly Wical, entitled "Content Processing System for Discourse", filed May 31, 1995.

Computer System

Figure 9:
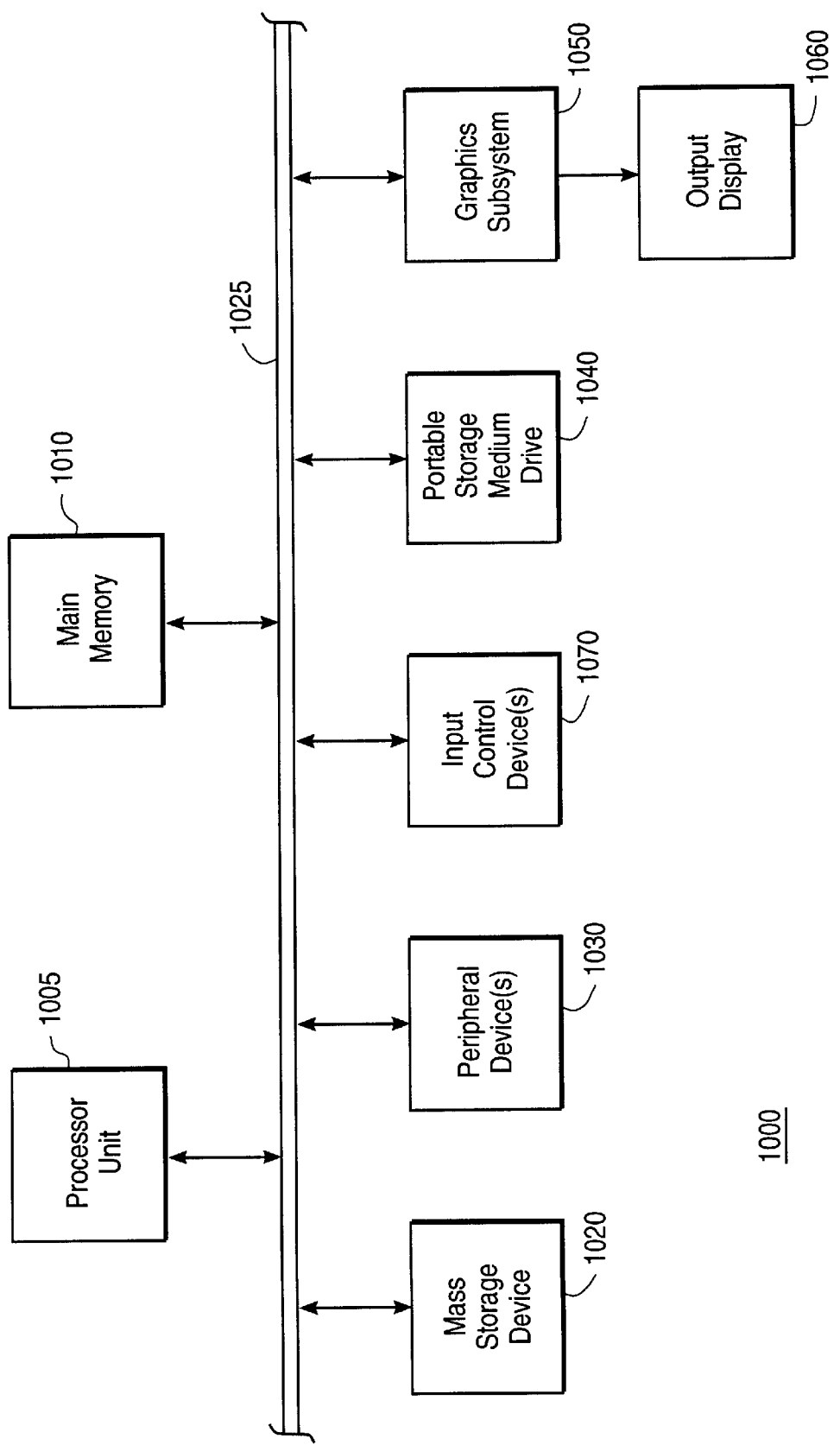
FIG. 9 illustrates a high level block diagram of a general purpose computer system in which the information retrieval system of the present invention may be implemented.

FIG. 9 illustrate a high level block diagram of a general purpose computer system in which the cluster processing system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the cluster processing system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. or purposes of simplicity, al components in the computer system 1000 are shown in FIG. 9 as bing connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the cluster processing system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the cluster processing system software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the cluster processing system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The cluster processing system may be implemented in either hardware or software. For the software implementation, the cluster processing system is software that includes a plurality of computer executable instructions for implementation on a general purpose computer system. Prior to loading into a general purpose computer system, the cluster processing system software may reside as encoded information on a computer readable medium, such as a magnetic floppy disk, magnetic tape, and compact disc read only memory (CD-ROM). In one hardware implementation, the cluster processing system may comprise a dedicated processor including processor instructions for performing the functions described herein. Circuits may also be developed to perform the functions described herein. The knowledge catalog 560 and knowledge database 155 may be implemented as a database stored in memory for use by the cluster processing system.

Although the present invention has been described in terms of specific exemplary embodiments, it will be appreciated that various modifications and alterations might be made by those skilled in the art without departing from the spirit and scope of the invention.

What is claimed is:

1. A method for learning a context of a term from a plurality of terms, said method comprising the steps of:

storing a knowledge base comprising a plurality of nodes of categories, arranged in a hierarchy to depict relationships among said categories, that represent concepts;

receiving a plurality of base terms with associated weight values;

receiving a term to learn a context of said term from said base terms;

selecting a set of nodes from said knowledge base with concepts that correspond with said base terms;

assigning quantitative values to nodes in said set of nodes from said weight values in said base terms;

selecting at least one cluster of categories of nodes from said knowledge base based on said quantitative values and said relationships of said categories in said knowledge base; and selecting a focal point category for said cluster of nodes that represents a concept most representative of said term to learn based on said weight values of said nodes, wherein said focal point category identifies a concept for said term.

2. The method as set forth in claim 1, wherein said base terms comprise themes from a corpus of documents.

3. A method for determining at least one focal node on a hierarchically arranged tree structure of nodes for attributes of a data set, said method comprising the steps of:

storing a tree structure comprising a plurality of nodes of tree structure attributes, arranged in a hierarchy, to depict relationships among said tree structure attributes;

receiving a data set comprising a plurality of data set attributes with associated weight values;

selecting a set of nodes from said tree structure with tree structure attributes that correspond with said data set attributes;

assigning quantitative values to nodes in said set of nodes from said weight values in said data set;

selecting at least one cluster of nodes, based on close proximity of said nodes in said tree structure; and selecting a focal node on said tree structure for said cluster of nodes based on said data set attributes, said focal node comprising tree structure attributes most representative of said data set attributes, wherein selection of said focal node includes evaluating attributes of said nodes of said cluster starting from a node at the top of said hierarchy of said tree structure and analyzing downward to select said focal node based on said quantitative values and said relationships of said attributes in said tree structure.

4. The method as set forth in claim 1, wherein the step of assigning quantitative values to nodes in said set of nodes from said weight values in said data set comprises the step of generating a raw weight for a node of said tree structure by summing weights for values of each attribute of said data set with a corresponding attribute.

5. The method as set forth in claim 1, wherein the step of assigning quantitative values to nodes in said set of nodes from said weight values in said data set comprises the step of summing weight values for a node in said set of nodes for all nodes that descend from said node.

6. The method as set forth in claim 1, wherein the step of assigning quantitative values to nodes in said set of nodes from said weight values in said data set comprises the step of dividing a weight value for a node in said set from a parent node proportionally among its child nodes based upon relative weight values of said child nodes.

7. The method as set forth in claim 1, wherein the step of selecting one or more clusters of nodes from said set of nodes based on said quantitative values and said relationships in said tree structure comprises the step of applying a breadth cut-off percent to determine how broadly across said tree structure to select nodes as part of a cluster.

8. The method as set forth in claim 1, wherein the step of selecting at least one focal point node for said cluster of nodes comprises the step of applying a depth cut-off percent to determine how far down in said hierarchy to select said focal point node.

9. A computer readable medium comprising a plurality of instructions, which when executed, cases the computer to determine at least one focal node on a hierarchically arranged tree structure of nodes for attributes of a data set, said instructions causing the computer to perform the steps of:

storing a tree structure comprising a plurality of nodes of tree structure attributes, arranged in a hierarchy, to depict relationships among said tree structure attributes;

receiving a data set comprising a plurality of data set attributes with associated weight values;

selecting a set of nodes from said tree structure with tree structure attributes that correspond with said data set attributes;

assigning quantitative values to nodes in said set of nodes from said weight values in said data set;

selecting at least one cluster of nodes, based on close proximity of said nodes in said tree structure; and selecting a focal node on said tree structure for said cluster of nodes based on said data set attributes, said focal node comprising tree structure attributes most representative of said data set attributes, wherein selection of said focal node includes evaluating attributes of said nodes of said cluster starting from a node at the top of said hierarchy of said tree structure and analyzing downward to select said focal node based on said quantitative values and said relationships of said attributes in said tree structure.

10. The computer readable medium as set forth in claim 9, wherein the step of assigning quantitative values to nodes in said set of nodes from said weight values in said data set comprises the step of generating a raw weight for a node of said tree structure by summing weights for values of each attribute of said data set with a corresponding attribute.

11. The computer readable medium as set forth in claim 9, wherein the step of assigning quantitative values to nodes in said set of nodes from said weight values in said data set comprises the step of summing weight values for a node in said set of nodes for all nodes that descend from said node.

12. The computer readable medium as set forth in claim 9, wherein the step of assigning quantitative values to nodes in said set of nodes from said weight values in said data set comprises the step of dividing a weight value for a node in said set from a parent node proportionally among its child nodes based upon relative weight values of said child nodes.

13. The computer readable medium as set forth in claim 9, wherein the step of selecting one or more clusters of nodes from said set of nodes based on said quantitative values and said relationships in said tree structure comprises the step of applying a breadth cut-off percent to determine how broadly across said tree structure to select nodes as part of a cluster.

14. The computer readable medium as set forth in claim 9, wherein the step of selecting at least one focal point node for said cluster of nodes comprises the step of applying a depth cut-off percent to determine how far down in said hierarchy to select said focal point node.

* * * * *

UNITED STATES PATENT AND TRADEMARK OFFICE
CERTIFICATE OF CORRECTION

PATENT NO. : 6,415,283 B1
DATED : July 2, 2002
INVENTOR(S) : Conklin

It is certified that error appears in the above-identified patent and that said Letters Patent is hereby corrected as shown below:

<u>Title page,</u>
Item [73], Assignee, "Orack Corporation" should read -- Oracle Corporation --.

Signed and Sealed this

Thirtieth Day of March, 2004

JON W. DUDAS
*Acting Director of the United States Patent and Trademark Office*